United States Patent
Cho et al.

(10) Patent No.: US 7,414,681 B2
(45) Date of Patent: Aug. 19, 2008

(54) LIQUID CRYSTAL DISPLAY DEVICE HAVING BLACK MATRIX COVERING PERIPHERY OF DISPLAY REGION

(75) Inventors: So-Haeng Cho, Daegu (KR); Won-Gyun Youn, Gumi-shi (KR)

(73) Assignee: LG Display Co., Ltd., Seoul (KR)

( * ) Notice: Subject to any disclaimer, the term of this patent is extended or adjusted under 35 U.S.C. 154(b) by 45 days.

(21) Appl. No.: 09/983,445

(22) Filed: Oct. 24, 2001

(65) Prior Publication Data

US 2002/0054253 A1    May 9, 2002

(30) Foreign Application Priority Data

Oct. 25, 2000    (KR) ............................... 2000-62804

(51) Int. Cl.
*G02F 1/1333*    (2006.01)

(52) U.S. Cl. ...................................... 349/110; 349/111

(58) Field of Classification Search .................. 349/110, 349/111
See application file for complete search history.

(56) References Cited

U.S. PATENT DOCUMENTS

| | | | | |
|---|---|---|---|---|
| 5,095,379 A | * | 3/1992 | Fukunaga et al. ............ 349/192 |
| 5,285,301 A | * | 2/1994 | Shirahashi et al. ........... 349/143 |
| 5,339,181 A | * | 8/1994 | Kim et al. ...................... 349/38 |
| 5,345,324 A | | 9/1994 | Koseki et al. .................. 359/67 |
| 5,434,433 A | * | 7/1995 | Takasu et al. .................. 257/59 |
| 5,477,355 A | * | 12/1995 | Sasaki et al. ................... 349/42 |
| 5,513,028 A | * | 4/1996 | Sono et al. .................... 349/139 |
| 5,617,230 A | * | 4/1997 | Ohgawara et al. ............ 349/110 |
| 5,626,796 A | * | 5/1997 | Tsujimura et al. ............ 252/582 |
| 5,719,648 A | * | 2/1998 | Yoshii et al. ................... 349/42 |
| 5,923,391 A | * | 7/1999 | Watanabe et al. ............ 349/110 |
| 5,946,068 A | | 8/1999 | Lee et al. ....................... 349/143 |
| 6,014,193 A | * | 1/2000 | Taira et al. ...................... 349/73 |

(Continued)

FOREIGN PATENT DOCUMENTS

EP    567281 A1    10/1993

(Continued)

*Primary Examiner*—Andrew Schechter
(74) *Attorney, Agent, or Firm*—McKenna Long & Aldridge LLP

(57) ABSTRACT

The present invention provides a liquid crystal display device including an array substrate, a color filter substrate and a liquid crystal layer therebetween. The array substrate having a display region and non-display regions includes a plurality of gate lines transversely arranged in the display region; a plurality of data lines arranged perpendicular to the plurality of gate lines in the display region; a plurality of pixel electrodes, each pixel electrode disposed in a pixel region defined by each pair of gate lines and data lines; and a plurality of thin film transistors in crossover points of the plurality of gate lines and data lines, each thin film transistor connected to each pixel electrode. The color filter substrate disposed opposite to and spaced apart from the array substrate includes a plurality of color filters, each color filter corresponding each, pixel electrode; and a black matrix layer covering the periphery of the display region of the array substrate and corresponding the non-display regions of the array substrate, wherein the black matrix layer extends over the pixel electrodes that are disposed in peripheral portions of the display regions.

15 Claims, 5 Drawing Sheets

U.S. PATENT DOCUMENTS

| | | | |
|---|---|---|---|
| 6,204,895 B1 * | 3/2001 | Nakamura et al. | 349/5 |
| 6,433,841 B1 * | 8/2002 | Murade et al. | 349/43 |
| 7,190,421 B2 * | 3/2007 | Hong et al. | 349/44 |
| 2002/0044239 A1 * | 4/2002 | Koyama | 349/110 |

FOREIGN PATENT DOCUMENTS

| | | |
|---|---|---|
| KR | 1998-0072227 | 11/1998 |
| KR | 10-0245973 | 12/1999 |

* cited by examiner

LIQUID CRYSTAL DISPLAY DEVICE HAVING BLACK MATRIX COVERING PERIPHERY OF DISPLAY REGION

This application claims the benefit of Korean Patent Application No. 2000-62804, filed on Oct. 25, 2000, which is hereby incorporated by reference as if fully set forth herein.

BACKGROUND OF THE INVENTION

1. Field of the Invention

The present invention relates to liquid crystal display devices. More particularly it relates to liquid crystal display devices preventing light leakage in peripheral portions.

2. Discussion of the Related Art

A liquid crystal display device uses the optical anisotropy and polarization properties of liquid crystal molecules to produce an image. Liquid crystal molecules have a definite orientational alignment as a result of their long, thin shapes. That orientational alignment can be controlled by an applied electric field. In other words, as an applied electric field changes, so does the alignment of the liquid crystal molecules. Due to the optical anisotropy, the refraction of incident light depends on the orientation of the liquid crystal molecules. Thus, by properly controlling an applied electric field a desired image can be produced.

Of the different types of known LCDs, active matrix LCDs (AM-LCDs), which have thin film transistors and pixel electrodes arranged in a matrix form, are the subject of significant research and development because of their high resolution and superiority in displaying moving images.

LCD devices have wide application in office automation (OA) equipment and video units because they are light and thin, and have low power consumption characteristics. The typical liquid crystal display (LCD) panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors (TFTs), and pixel electrodes.

As previously described, LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

FIG. 1 is a schematic cross-sectional view illustrating a conventional LCD cell in an active matrix LCD. As shown, the LCD cell 20 has lower and upper substrates 2 and 4 and a liquid crystal (LC) layer 10 interposed therebetween. The lower substrate 2 has a thin film transistor (TFT) "T" as a switching element that switches a voltage that changes the orientation of the LC molecules. The lower substrate 2 also includes a pixel electrode 14 that is used to apply an electric field across the LC layer 10 in response to signals applied to the TFT "T." The upper substrate 4 has a color filter 8 for producing a color, and a black matrix 7 shielding light in non-display regions and preventing the thin film transistor from light irradiation. Furthermore, the upper substrate 4 includes a common electrode 9 on the color filter 8 and black matrix 7. The common electrode 9 serves as an electrode that produces the electric field across the LC layer (with the assistance of the pixel electrode 14). The pixel electrode 14 is arranged over a pixel portion "P," i.e., a display region. A lower orientation layer 11 that serves to align the liquid crystal molecules for selectively transmitting light is disposed on the pixel electrode 14 and over the TFT "T," while an upper orientation layer 5 that serves to align the liquid crystal molecules with the lower orientation layer 11 is on the common electrode 9. Further, to prevent leakage of the LC layer 10, a pair of substrates 2 and 4 are sealed by a sealant 6.

The lower substrate needs several more processes than the upper substrate, such as a deposition process and a photolithography process. Since the deposition and photolithography processes are carried out several times when forming the array substrate, several steps are formed in an array matrix type on the lower substrate.

FIG. 2 is a schematic partial plan view showing a display region and non-display regions of the liquid crystal display of FIG. 1. In FIG. 2, the liquid crystal display cell 20 is widely divided into the display region 40 in which images are displayed, and the non-display regions 30 in which alignment keys (not shown) and shorting bars (not shown) are disposed. The alignment keys are points to align the upper substrate to the lower substrate, and the shorting bars serve in the circuit test. The non-display regions 30 are detached in later steps after the circuit test and attaching the upper substrate to the lower substrate. In the display region 40, a plurality of gate lines 42 are arranged in a transverse direction and a plurality of data lines 44 are arranged perpendicular to the plurality of gate lines 42. In each crossover point of the gate lines 42 and the data lines 44, a thin film transistor (TFT) "T" is disposed in a matrix type. A plurality of pixel electrodes 46 are placed in pixel regions defined by the gate lines 42 and the data lines 44. Further, the plurality of pixel electrodes 46 are divided into first pixel electrodes 46a disposed in peripheral portions of the display region 40, and second pixel electrodes 46b disposed in an inner portion of the display region 40.

Still referring to FIG. 2, an arrow "$R_D$" represents an exemplary rubbing direction when the lower orientation layer 11 of FIG. 1 is rubbed for aligning the liquid crystal molecules. At this time, the periphery such like areas "$L_1$" is irregularly rubbed due to the steps of the array matrix structure. Especially, when the rubbing direction is from bottom to top as shown in FIG. 2, the rubbing irregularity exceedingly occurs in both right and left areas such like the area "$L_1$." Further, this rubbing irregularity causes light leakage in the periphery of the liquid crystal display when a driving voltage is applied to the pixel electrodes 46.

FIG. 3 is a cross-sectional view taken along the line III-III of FIG. 2 and illustrates a peripheral portion of the display region. In FIG. 3, the lower substrate 2 includes the first pixel electrode 46a and the data lines 44 which are disposed over the substrate 1 and separated from each other. The lower orientation layer 11 is disposed on the first pixel electrode 46a and over the data line 44. The upper substrate 4 includes the black matrix 7 and color filter 8 on the substrate 1. The common electrode 9 is disposed on the black matrix 7 and color filter 8, and the upper orientation layer 5 is disposed on the common electrode 9. The black matrix 7 corresponds to the non-pixel region in which the data line 44 is arranged, while the color filter 8 corresponds to the pixel region that is the display region. Liquid crystal molecules 15 are disposed between the lower substrate 2 and the upper substrate 4, thereby forming a liquid crystal layer 10. As a material for the upper and lower orientation layers 5 and 11, polyimide is mainly used. Polyimide aligns the liquid crystal molecules so that they are parallel to the substrate 1.

In general, the upper and lower orientation layers 5 and 11 are rubbed in one direction to align the liquid crystal molecules 15 and make the liquid crystal molecules 15 have pretilt angle. In the rubbing process, a rubbing fabric rolled onto a roller is widely used and the upper and lower orientation layers 5 and 11 are rubbed to have a plurality of minute grooves on their surface using this rubbing fabric. Therefore, the surfaces of the orientation layers are rubbed in a uniform direction. However, the peripheral portions of the liquid crystal display, such as a region "R" of FIG. 3, are irregularly rubbed rather than an inner portion. Especially, this rubbing irregularity easily occurs in the lower substrate 2 due to the fact that the lower substrate 2 includes several array matrix structures and has several steps caused by the array matrix elements. Especially, because of the steps between the display region 40 and the non-display regions 30 (in FIG. 2), the region "R" of FIG. 3 in the first pixel electrode 46a is not properly rubbed. Thereby, the liquid crystal molecules 15 disposed within the region "R" of the first pixel electrode 46a are not properly arranged when the voltage is applied to the pixel electrode, thereby giving rise to light leakage. The irregularities of the surface of the region "R" (i.e., the irregularly rubbed area) depend on the rubbing direction of the orientation layer.

As described above, light leakage occurring in the periphery of the liquid crystal display deteriorates and decreases the display quality of the liquid crystal display device.

SUMMARY OF THE INVENTION

Accordingly, the present invention is directed to a liquid crystal display (LCD) device that substantially obviates one or more of the problems due to limitations and disadvantages of the related art.

An object of the present invention is to provide an LCD device, which has a structure that prevents light leakage.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

In order to achieve the above object, the present invention provides a liquid crystal display device that includes an array substrate having a display region and non-display regions, a color filter substrate disposed opposite to and spaced apart from the array substrate, a first orientation layer on the array substrate; and a second orientation layer arranged on the color filter substrate. The first and second orientation layers include at least polyimide.

In the inventive liquid crystal display device, the array substrate having a display region and non-display regions includes a plurality of gate lines transversely arranged in the display region; a plurality of data lines arranged perpendicular to the plurality of gate lines in the display region; a plurality of pixel electrodes, each pixel electrode disposed in a pixel region defined by each pair of gate lines and data lines; and a plurality of thin film transistors in crossover points of the plurality of gate lines and data lines, each thin film transistor connected to each pixel electrode.

In the inventive liquid crystal display device, the color filter substrate disposed opposite to and spaced apart from the array substrate includes a plurality of color filters, each color filter corresponding to each pixel electrode; and a black matrix layer covering the periphery of the display region of the array substrate and corresponding to the non-display regions of the array substrate, wherein the black matrix layer extends over the pixel electrodes that are disposed in peripheral portions of the display regions. The color filter substrate further includes a common electrode on the black matrix layer and plurality of color filters. Especially, the black matrix layer covers portions of the pixel electrodes disposed in the periphery of the array substrate.

In another aspect of the invention, a method of making a liquid crystal display (LCD) device having first and second substrates, the first substrate having a display region and non-display regions, comprises forming a black matrix layer on a second substrate, the black matrix layer covering the non-display regions and a periphery of the display region; forming a color filter layer on the second substrate; and forming a liquid crystal layer between the first substrate and the second substrate.

In a further aspect of the present invention, a method of making a liquid crystal display (LCD) device having first and second substrates, the first substrate having a display region and non-display regions, comprises forming a plurality of data lines on the first substrate in the non-display regions; forming a plurality of pixel electrodes on the first substrate in the display region; forming a first orientation layer on the plurality of pixel electrodes; forming a black matrix layer on the second substrate, the black matrix layer covering the non-display regions and the periphery of the display region; forming a color filter layer on the second substrate; and forming a liquid crystal layer between the first substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate the present invention and together with the description serve to explain the principles of that invention.

In the drawings.

DETAILED DESCRIPTION OF THE ILLUSTRATED EMBODIMENT

Reference will now be made in detail to an illustrated embodiment of the present invention, an example of which is shown in the accompanying drawings. Wherever possible, the same reference numbers will be used throughout the drawings to refer to the same or the parts.

In general, a liquid crystal display device includes a lower substrate (often referred to as an array substrate) in which a plurality of thin film transistors (TFTs), i.e., switching devices, are arranged; an upper substrate (often referred to as a color filter substrate) on which a plurality of color filters and a black matrix are formed; and a liquid crystal layer therebetween.

Figure 4:
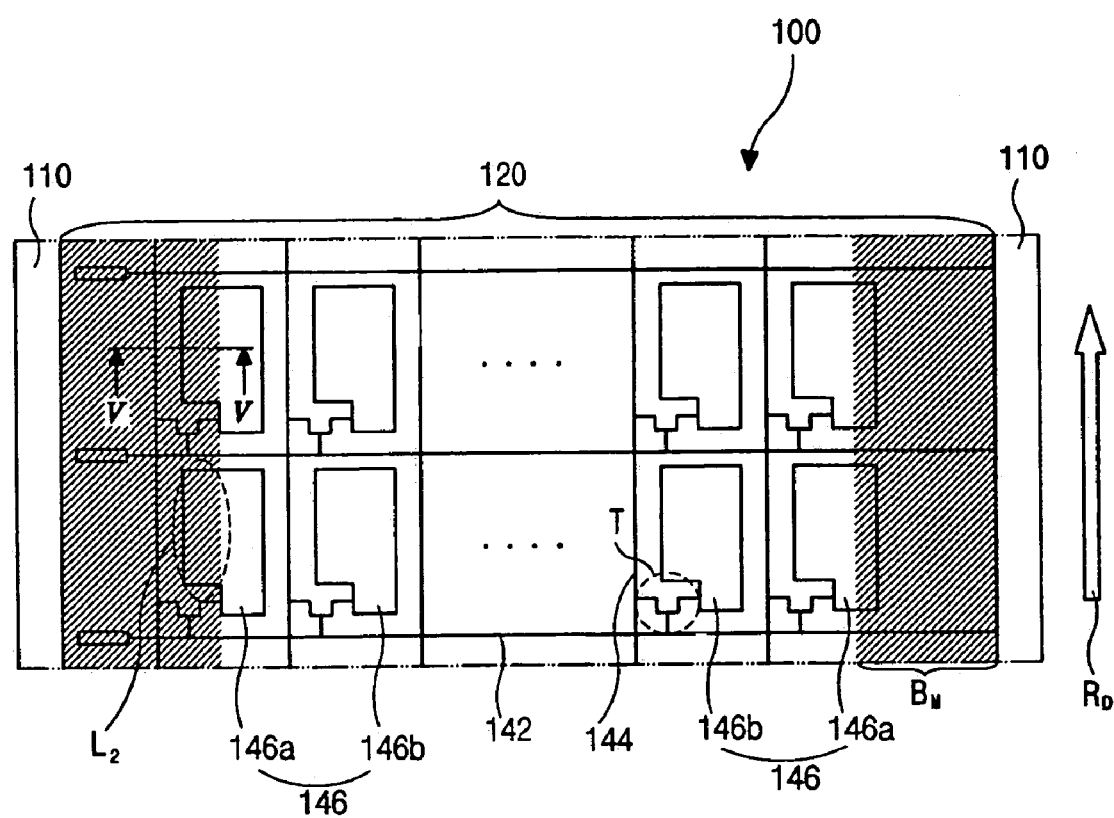
FIG. 4 is a schematic partial plan view showing a display region and non-display regions of the liquid crystal display according to the present invention.

FIG. 4 is a schematic partial plan view showing a display region and non-display regions of the liquid crystal display device according to the present invention. In FIG. 4, the liquid crystal display device 100 is widely divided into the non-display regions 110 in which images are not displayed, and the display region 120 in which the images are displayed. The non-display regions 110 include alignment keys (not shown) and shorting bars (not shown). The alignment keys are the points to align the upper substrate to the lower substrate, and the shorting bars serve in the circuit test. The non-display regions 110 are detached in later steps after the circuit test and attaching the upper substrate to the lower substrate.

In the display region 120 of FIG. 4, a plurality of gate lines 142 are arranged in a transverse direction and a plurality of data lines 144 are arranged perpendicular to the plurality of gate lines 142. In each crossover point of the gate lines 142 and the data lines 144, a thin film transistor (TFT) "T" is disposed in a matrix type. A plurality of pixel electrodes 146 are placed in pixel regions defined by the gate lines 142 and the data lines 144. Further, the plurality of pixel electrodes 146 are divided into first pixel electrodes 146a disposed in peripheral portions of the display region 120, and second pixel electrodes 146b disposed in an inner portion of the display region 120.

Figure 5:
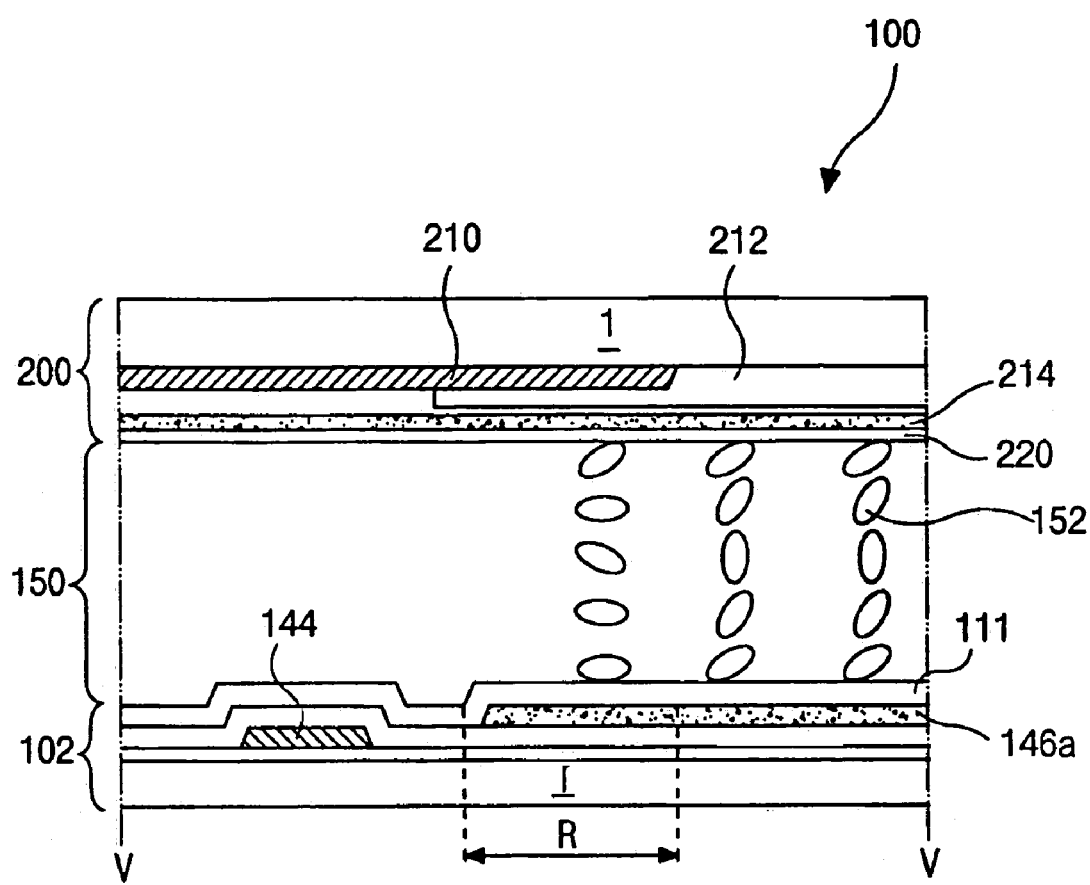
FIG. 5 is a cross-sectional view taken along the line V-V of FIG. 4 and illustrates a peripheral portion of the display region.

Still referring to FIG. 4, an arrow "$R_D$" represents an exemplary rubbing direction when a lower orientation layer 111 of FIG. 5 is rubbed for aligning the liquid crystal molecules. At this time in FIG. 4, the periphery of the display region 120, such as an area "$L_2$," is irregularly rubbed due to the steps of the array matrix structure as described before. However, a black matrix 210 of FIG. 5 is disposed in periphery "$B_M$" (i.e., black matrix areas) of the display region 120 in FIG. 4. Especially, the black matrix 210 of FIG. 5 overlaps the irregularly rubbed areas of the first pixel electrodes 146a, such as the area "$L_2$," thereby preventing light leakage caused by the rubbing irregularity.

Figure 1:
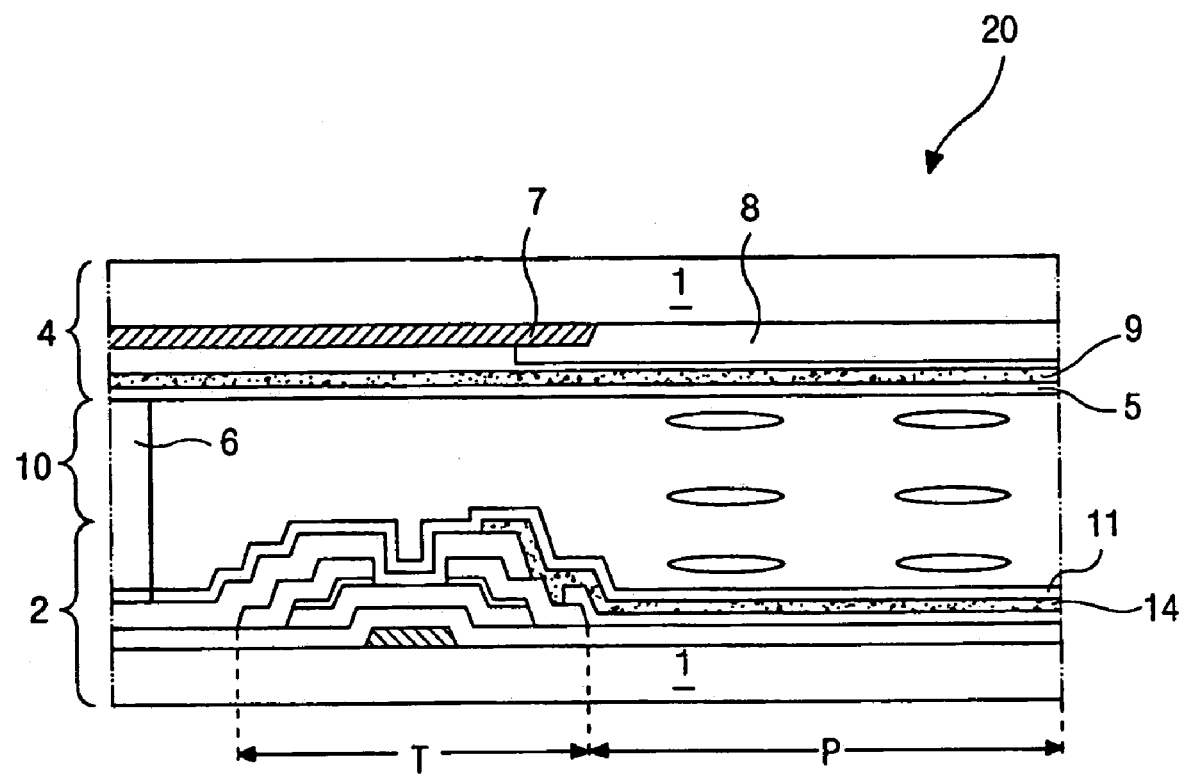
FIG. 1 is a schematic cross-sectional view illustrating one pixel of a liquid crystal display device according to the related art.
Figure 2:
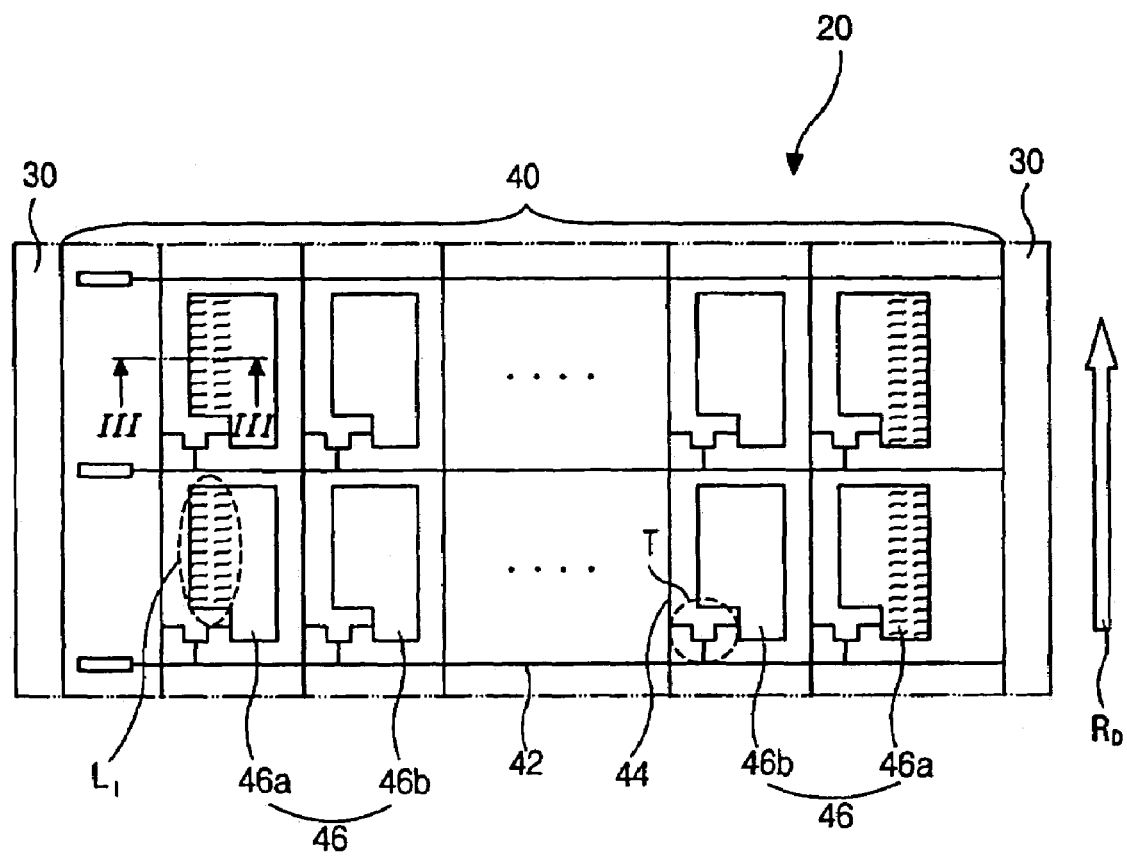
FIG. 2 is a schematic partial plan view showing a display region and non-display regions of the liquid crystal display of FIG. 1.
Figure 3:
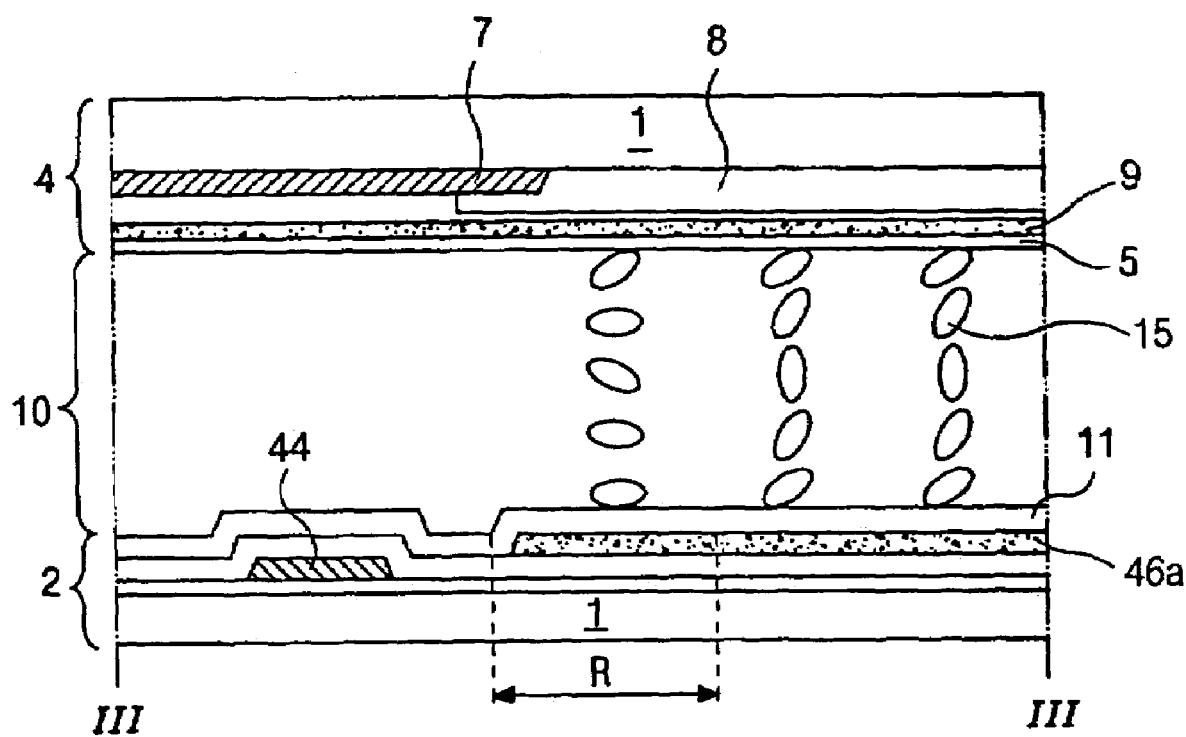
FIG. 3 is a cross-sectional view taken along the line III-III of FIG. 2 and illustrates a peripheral portion of the display region.

Still referring to FIG. 2, an arrow "$R_D$" represents an exemplary rubbing direction when a lower orientation layer 111 of FIG. 5 is rubbed for aligning the liquid crystal molecules. At this time in FIG. 4, the periphery of the display region 120, such as an area "$L_2$," is irregularly rubbed due to the steps of the array matrix structure as described before. However, a black matrix 210 of FIG. 5 is disposed in periphery "$B_M$" (i.e., black matrix areas) of the display region 120 in FIG. 4. Especially, the black matrix 210 of FIG. overlaps the irregularly rubbed areas of the first electrodes 146a, such as the area "$L_2$," thereby preventing light leakage caused by the rubbing irregularity.

In other words, a portion of the lower orientation layer disposed on the outer portions of the first pixel electrodes 146a is irregularly rubbed mainly due to the steps of the array matrix structures. The liquid crystal molecules disposed on this irregularly rubbed area are not properly arranged, thereby causing light leakage. Therefore, the black matrix is correspondingly formed over the black matrix areas "$B_M$" to cover the irregularly rubbed area, such as the area "$L_2$."

FIG. 5 is a cross-sectional view taken along the line V-V of FIG. 4 and illustrates a peripheral portion of the display region. In FIG. 5, the lower substrate 102 includes the first pixel electrode 146a and the data lines 144 which are disposed over the substrate 1 and separated each other. The lower orientation layer 111 is disposed on the first pixel electrode 146a and over the data line 144. The upper substrate 200 includes a black matrix 210 and a color filter 212 on the substrate 1. The common electrode 214 is disposed on the black matrix 210 and color filter 212, and the upper orientation layer 220 is disposed on the common electrode 214. Liquid crystal molecules 152 are disposed between the lower substrate 102 and the upper substrate 200, thereby forming a liquid crystal layer 150. As mentioned before, polyimide is mainly used for the lower and upper orientation layers 111 and 220. Polyimide aligns the liquid crystal molecules 152 so that they are parallel to the substrate 1.

Further referring to FIG. 5, a portion "R" of the first pixel electrode 146a is irregularly rubbed area, and thus the liquid crystal molecules 152 disposed within the portion "R" are not properly arranged. However, the black matrix 210 on the substrate 1 correspondingly covers the irregularly rubbed portion "R," thereby preventing light leakage that occurs in the portion "R." In other words, since the black matrix 210 extends over the portion "R" of the first pixel electrode 146a in which the lower orientation layer 111 is irregularly rubbed and the liquid crystal molecules 152 are not properly arranged, light leakage caused by the non-properly arranged liquid crystal molecules 152 is prevented. As aforementioned, light leakage is prevented without additional process, thereby increasing the display quality.

It will be apparent to those skilled in the art that various modifications and variations can be made in the array substrate of the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
a first substrate having a display region and non-display regions;
a plurality of gate lines transversely arranged in the display region;
a plurality of data lines arranged perpendicular to the plurality of gate lines in the display region;
a plurality of pixel electrodes disposed in pixel regions defined by the gate and data lines and a first orientation layer on the plurality of pixel electrodes, the pixel electrodes including first pixel electrodes disposed in a direction parallel with a rubbing direction of the first orientation layer in the periphery of the display region and second pixel electrodes disposed in an inner portion of the display region, wherein the first pixel electrodes are divided into first and second portions and the first portions of the first pixel electrodes include an irregularly rubbed area and are each arranged parallel to the rubbing direction of the first orientation layer;
a plurality of thin film transistors in crossover points of the gate lines and data lines, each thin film transistor connected to each pixel electrode and the respective gate and data lines;
a black matrix layer on a second substrate, the black matrix layer covering only the first portions of the first pixel electrodes;
a color filter layer on the second substrate; and
a liquid crystal layer between the first substrate and the second substrate.

2. The device of claim 1, wherein the second substrate further comprises a common electrode on the color filter layer.

3. The device of claim 1, wherein the first orientation layer is formed on the first portions of the first pixel electrodes.

4. The device of claim 1, wherein the first orientation layer includes polyimide.

5. The device of claim 1, further comprising a second orientation layer on the second substrate.

6. The device of claim 5, wherein the second orientation layer includes polyimide.

7. A liquid crystal display (LCD) device, comprising:
   a first substrate having a display region and non-display regions;
   a plurality of data lines on the first substrate in the non-display regions;
   a first orientation layer on the plurality of pixel electrodes;
   a plurality of gate lines transversely arranged in the display region;
   a plurality of data lines arranged perpendicular to the plurality of gate lines in the display region;
   a plurality of pixel electrodes on the first substrate disposed in pixel regions defined by the gate and data lines, the pixel electrodes including first pixel electrodes disposed in a direction parallel with a rubbing direction of the first orientation layer in the periphery of the display region and second pixel electrodes disposed in an inner portion of the display region, wherein the first pixel electrodes are divided into first and second portions and the first portions of the first pixel electrodes include an irregularly rubbed area and are each arranged parallel to the rubbing direction of the first orientation layer;
   a plurality of thin film transistors in crossover points of the gate lines and data lines, each thin film transistor connected to each pixel electrode and the respective gate and data lines;
   a black matrix layer on a second substrate, the black matrix layer covering only the first portions of the first pixel electrodes;
   a color filter layer on the second substrate; and
   a liquid crystal layer between the first substrate and the second substrate.

8. A method of making a liquid crystal display (LCD) device having first and second substrates, the first substrate having a display region and non-display regions comprising:
   forming a plurality of gate lines transversely arranged in the display region of the first substrate;
   forming a plurality of data lines arranged perpendicular to the plurality of gate lines in the display region of the first substrate;
   forming a plurality of pixel electrodes disposed in pixel regions defined by the gate and data lines and a first orientation layer on the plurality of pixel electrodes, wherein the pixel electrodes are divided into first pixel electrodes disposed in a direction parallel with a rubbing direction of the first orientation layer in the periphery of the display region, and second pixel electrodes disposed in an inner portion of the display region, and wherein the first pixel electrodes are further divided by first and second portions and the first portions of the first pixel electrodes include an irregularly rubbed area and are each arranged parallel to the rubbing direction of the first orientation layer;
   forming a plurality of thin film transistors in crossover points of the gate lines and data lines, each thin film transistor connected to each pixel electrode and the respective gate and data lines;
   forming a black matrix layer on a second substrate, the black matrix layer covering only the first portions of the first pixel electrodes;
   forming a color filter layer on the second substrate and black matrix layer; and
   forming a liquid crystal layer between the first substrate and the second substrate.

9. The method of claim 8, further comprising forming a common electrode on the second substrate.

10. The method of claim 8, wherein the first orientation layer is formed on the first portions of the first pixel electrodes.

11. The method of claim 8, wherein the first orientation layer includes polyimide.

12. The method of claim 8, further comprising a second orientation layer on the second substrate.

13. The method of claim 12, wherein the second orientation layer includes polyimide.

14. A method of making a liquid crystal display (LCD) device having first and second substrates, the first substrate having a display region and non-display regions, comprising:
   forming a plurality of data lines on the first substrate in the non-display regions;
   forming a plurality of pixel electrodes on the first substrate in the display region;
   forming a first orientation layer on the plurality of pixel electrodes;
   forming a plurality of gate lines transversely arranged in the display region of the first substrate;
   forming a plurality of data lines arranged perpendicular to the plurality of gate lines in the display region of the first substrate;
   forming a plurality of pixel electrodes disposed in pixel regions defined by the gate and data lines, wherein the pixel electrodes are divided into first pixel electrodes disposed in a direction parallel with a rubbing direction of the first orientation layer in the periphery of the display region, and second pixel electrodes disposed in an inner portion of the display region, and wherein the first pixel electrodes are further divided by first and second portions and the first portions of the first pixel electrodes include an irregularly rubbed area and are each arranged parallel to the rubbing direction of the first orientation layer;
   forming a plurality of thin film transistors in crossover points of the gate lines and data lines, each thin film transistor connected to each pixel electrode and the respective gate and data lines;
   forming a black matrix layer on the second substrate, the black matrix layer only covering the first portions of the first pixel electrodes;
   forming a color filter layer on the second substrate; and
   forming a liquid crystal layer between the first substrate and the second substrate.

15. A liquid crystal display (LCD) device, comprising:
   a first substrate having a display region and non-display regions;
   a plurality of gate lines and a plurality of data lines in the display region to form a plurality of pixel regions;
   a plurality of display pixel electrodes disposed in the plurality of pixel regions and an orientation layer on the plurality of display pixel electrodes, the display pixel electrodes including first portions of the display pixel electrodes disposed in a periphery of the display region and second portions of the display pixel electrodes disposed in an inner portion of the display region, wherein the first portions of the display pixel electrodes include an irregularly rubbed area, and the first portions of the display pixel electrodes are each arranged parallel to a rubbing direction of the orientation layer;
a plurality of thin film transistors near crossover points of the gate lines and data lines, each thin film transistor connected to each pixel electrode;
a black matrix layer on a second substrate, the black matrix layer covering only the first portions of the display pixel electrodes;
a color filter layer on the second substrate; and
a liquid crystal layer between the first substrate and the second substrate.

* * * * *